June 7, 1955   B. E. LARSON   2,709,869
SUBMERGIBLE BAIT SCENT DISPENSERS
Filed June 14, 1951

*INVENTOR.*
*BOB E. LARSON*

BY Everett N. Curtis

*ATTORNEY*

United States Patent Office 2,709,869
Patented June 7, 1955

2,709,869

SUBMERGIBLE BAIT SCENT DISPENSERS

Bob E. Larson, San Diego, Calif.

Application June 14, 1951, Serial No. 231,552

1 Claim. (Cl. 43—44.99)

My invention relates to submergible bait scent dispensers, particularly as employed by fishermen for the tolling of fish, and its objects are to disseminate and to spread through waters where fish are present or are likely to be found, the scent, aroma or flavor of the bait without having materially to release such bait therein; to direct the spread of said scent or flavor in the water and in the line of travel pursued by the fishing boat; to allow said bait to be held in submergible wire meshed or perforated receptacles provided therefor and whose contents may readily be discharged or replenished as desired; to provide means for attachment and detachment of said receptacles and submergence thereof from the sides or other parts of the fishing boat; to render the parts accessible for inspection, adjustment, replacement or repair, and in general to provide a bait scent dispenser which is simple and economical of construction, saving of labor and materials, and of prolonged life and durability. These and other objects will appear from the drawing and as hereinafter more fully set forth.

My invention primarily consists in an upright funnelled goose neck conduit having its lower end turned backwardly and secured to and leading into a wire meshed receptacle; and means for removably securing said goose neck to the side of a fishing boat, and submerging said receptacle.

My invention further consists in providing a spring actuated closure for said receptacle, and manually operated mechanism for opening and closing the same.

My invention further consists in providing inlets in the submerged end of said goose neck adjacent to said receptacle and so formed and located as to cause the enforced admission into said receptacle of water when the said wings are pulled therethrough.

My invention further consists of other novel features of construction, and combinations and arrangements of elements and parts illustrated in the drawing and as hereinafter more specifically pointed out and claimed.

Attention is hereby directed to the accompanying drawing, illustrating a preferred form of my invention, in which similar numerals of designation refer to similar parts throughout the several views, and in which—

Figure 1:
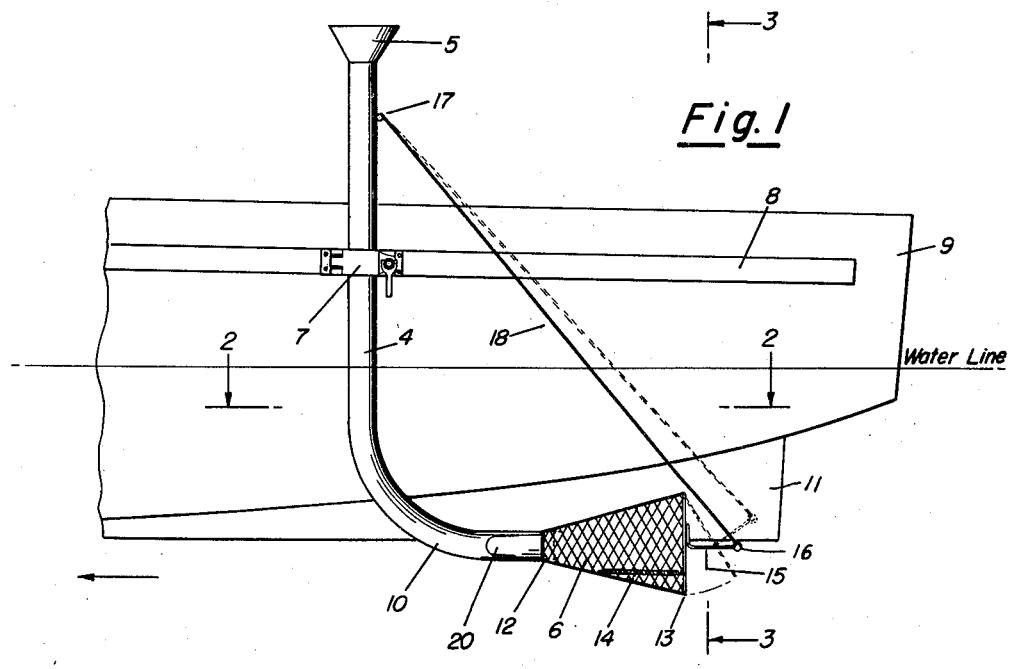
Figure 1 is a side elevational view of the said form of my invention, showing the same rearwardly extending and detachably secured by a bracket to the port side of a fishing boat adjacent to the stern thereof.
Figure 2:
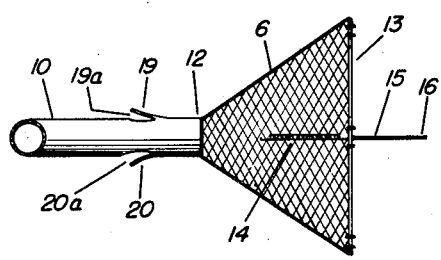
Fig. 2 is a plan view of the lower end of the goose neck and wire meshed bait receptacle affixed thereto, on line 2—2 of Fig. 1, looking in the direction indicated by the arrows.
Figure 3:
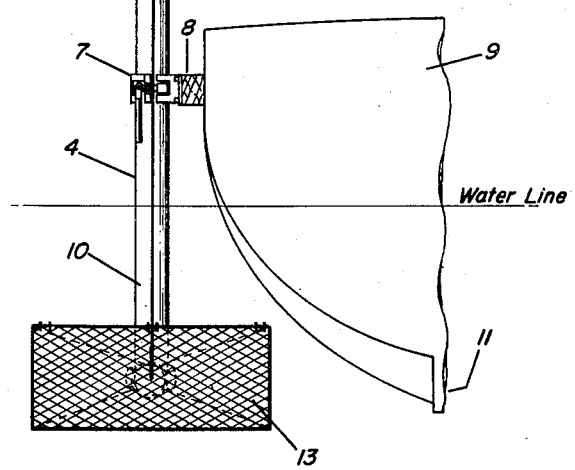
Fig. 3 is a rear end elevation of my device and attachment thereof to the boat, on line 3—3, of Fig. 1, looking in the direction indicated by the arrows.

Referring to the drawing, the bait dispenser there illustrated is composed generally of the curved tube forming the goose neck 4, and the funnel 5 affixed to and forming part of the said goose neck, and the wire meshed bait receptacle 6 secured to the lower end of said goose neck; the bracket 7 serving detachably to secure said goose neck to the guard rail 8 of the fishing boat 9, and both said goose neck and said receptacle being mounted adjacent to the stern of said boat.

The goose neck 4 is preferably a tubular conduit of steel, aluminum or other metal, but may be of any material sufficiently sturdy for the purpose. The passageway of the said conduit should be of sufficient diameter to allow the ready flow of chopped up bait therethrough; and the funnel 5 should be sufficiently ample to allow the ready introduction therein of the said bait. As shown the lower portion 10 of said goose neck is bent backward in full clearance of the side of the boat and so as to be adjacent and substantially parallel to the keel 11 thereof.

The bait receptacle 6 is preferably in the form of a frusto-pyramidal shaped wire meshed hopper, the open smaller end 12 of which is firmly secured to, and communicates with the passageway of, the lower end of said goose neck. Covering the mouth or base end of said hopper and hinged to one side thereof is the lid 13, normally held in tightly closed position by the helical tension spring 14 affixed thereto and to one side of the said hopper. Extending outwardly from the lid 13 is the arm 15 provided with the eye 16 in the end thereof; to which eye 16 and to the eye 17 secured to the top end of the goose neck is fastened the cord 18, manually operable for opening and permitting the closing of the lid 13. As shown, said receptacle is located in proximity to and a little below the bottom of the boat and has its long axis parallel with the keel 11 thereof, with the mouth of the hopper directed toward the wake of said boat.

Cut from the walls of the lower portion 10 of the goose neck are the flanges 19, 20, forming the openings 19a and 20a through said walls, and serving as inlets for the admission of water when submerged therein. These flanges are openly spread forwardly at an angle to the line of passage of the boat, which when under way will cause the water to be caught and diverted inwardly through the said openings, and allow said water to move into and through the hopper 6 and out again into the surrounding sea, and assisting to carry with it the flavor, aroma and scent of the bait contained in said hopper, without removing any substantial portion of said bait from said hopper.

To operate my improved form of bait dispenser, I first attach the same through the use of the bracket 7, to the guard rail of a fishing vessel or other convenient part thereof. If desired, several dispensers may be used, disposed in different parts of the vessel. In mounting each of the dispensers, I preferably submerge the bait receptacle or hopper 6 to a depth corresponding to that of the bottom of the vessel and below the water line thereof, and make the desired adjustments as to clearance and direction accordingly. Then when what are thought to be the fishing grounds are reached, or if desired in preparation therefor, I introduce through the funnel and goose neck sufficient chopped bait completely to fill the said receptacle. Thereupon, as the boat proceeds upon its way, the said receptacle will rapidly be dragged through the water, and the water impinging thereon and passing therethrough will carry with it the flavor and aroma of the bait into a wide pathway through the sea. In addition, such procedure will be greatly aided through the forced introduction and movement of the water due to the position of the flanges 19, 12, and impelled through and from the inlets 19a and 2a into the said receptacle or hopper 6 as above described. By thus laying paths of scented water over wide areas, fish will be attracted thereto with but small expenditure of toll bait, and upon returning through such paths, schools of fish will more readily be located and larger catches secured. As soon as it be determined that the aroma of the bait in the receptacle has become exhausted, the same can readily be replenished through the opening of the lid 13 by pulling upon the cord 18 which accomplishes the discharge of the contents thereof and the refilling of said receptacle again through bait introduced through the funnel 5 and goose neck 4.

My invention may be embodied in other specific forms without departing from the spirit or essential characteristics thereof. The present embodiments, as above set forth, are therefore to be considered in all respects as illustrative and not restrictive, the scope of my invention being indicated by the appended claim rather than by the foregoing description, and all changes which may come within the meaning and range of equivalency of the claim are therefore intended to be embraced therein.

What I claim and desire to secure by Letters Patent is:

In combination with a fishing boat, a submergible bait scent dispenser comprising a wire mesh receptacle having outwardly flared sides, means for submerging and securing said receptacle to the stern of the boat below the water line, said means consisting of a relatively rigid gooseneck conduit secured to the side of the body in the proximity of the stern, said conduit having an upper funnel portion to permit the ready introduction of bait therein and being connected to and in communication with at its lower end the said receptacle, the conduit being so oriented that the lower section of the gooseneck is rearwardly directed, the walls of the said lower section having cut out flanges which form openings through the walls of the conduit for the admission of water thereinto, the said flanges being directed forwardly so that when the boat is underway, water will be channeled by the flanges through the openings into the conduit and forcibly discharged therefrom into the receptacle to thus aid in the dissemination of the bait.

References Cited in the file of this patent

UNITED STATES PATENTS

| | | |
|---|---|---|
| 455,758 | Moulsong | July 14, 1891 |
| 742,414 | Hale | Oct. 27, 1903 |
| 1,745,251 | Enright | Jan. 28, 1930 |
| 2,163,282 | Hovden | June 20, 1939 |
| 2,465,127 | Stark | Mar. 22, 1949 |
| 2,614,358 | Adams | Oct. 21, 1952 |

FOREIGN PATENTS

| | | |
|---|---|---|
| 788,322 | France | July 29, 1935 |